Oct. 7, 1952 — M. M. CUNNINGHAM — 2,613,169
METHOD OF MAKING COLLAPSIBLE CONTAINERS
Filed Feb. 16, 1950 — 5 Sheets-Sheet 1

INVENTOR.
MARION M. CUNNINGHAM
BY
Charles E. Willson
ATTORNEY

Oct. 7, 1952 M. M. CUNNINGHAM 2,613,169
METHOD OF MAKING COLLAPSIBLE CONTAINERS
Filed Feb. 16, 1950 5 Sheets-Sheet 2

INVENTOR.
MARION M. CUNNINGHAM
BY
Charles C. Willson
ATTORNEY

Oct. 7, 1952     M. M. CUNNINGHAM     2,613,169
METHOD OF MAKING COLLAPSIBLE CONTAINERS
Filed Feb. 16, 1950     5 Sheets-Sheet 3

INVENTOR.
MARION M. CUNNINGHAM
BY
Charles E. Willson
ATTORNEY

Oct. 7, 1952 — M. M. CUNNINGHAM — 2,613,169
METHOD OF MAKING COLLAPSIBLE CONTAINERS
Filed Feb. 16, 1950 — 5 Sheets-Sheet 4

INVENTOR.
MARION M. CUNNINGHAM
BY
Charles B. Willson
ATTORNEY

Oct. 7, 1952 M. M. CUNNINGHAM 2,613,169
METHOD OF MAKING COLLAPSIBLE CONTAINERS
Filed Feb. 16, 1950 5 Sheets-Sheet 5

INVENTOR.
MARION M. CUNNINGHAM
BY Charles C. Willson
ATTORNEY

Patented Oct. 7, 1952

2,613,169

UNITED STATES PATENT OFFICE 2,613,169

METHOD OF MAKING COLLAPSIBLE CONTAINERS

Marion M. Cunningham, Woonsocket, R. I., assignor to United States Rubber Company, New York, N. Y., a corporation of New Jersey Application February 16, 1950, Serial No. 144,523

15 Claims. (Cl. 154—83)

This invention relates to a novel method of making collapsible, fluid-tight shipping containers having the form of a barrel or drum and constructed primarily of coated cord fabric; that is fabric made up of reinforcing cords embedded in a rubber or similar plastic material.

A collapsible container constructed as herein disclosed is claimed as an article in my copending application Serial No. 131,407 filed December 6, 1949.

Drum-shaped shipping containers formed of metal are used extensively, and the 55 gallon steel drum is used in large quantities as a shipping container for petroleum products, paint, dyes and other liquids and also as a container for powdered dry materials. Such shipping containers if made of aluminum or other non-ferrous metal are expensive, and if made of steel, as is usually the case, they tend to rust and therefore do not last long unless they are frequently cleaned and repainted.

The present invention contemplates a novel method of making flexible, tough, durable, shipping or storage containers having the shape of a barrel or drum and formed primarily of reinforced rubber, to provide liquid-tight containers which will last much longer than the steel shipping drums now in extensive use, and which possesses other advantages.

The shipping container herein contemplated preferably has a cylindrical body formed of cord fabric and rounded convex heads or ends also formed of cord fabric, similar to the cord fabric used in automobile tires. The cylindrical body portion of the container is formed of two, four or more plies of cord fabric, each ply being positioned so that the cords extend helically about the drum and form a large acute angle with the longitudinal axis of the drum, with the cords of one ply crossing the cords of the next ply at a pronounced angle. The heads of the container are likewise preferably formed of two or more plies of cord fabric, and arranged so that the cords of the different plies are disposed at equal angles one to another, and the outer marginal portions of these head plies are positioned to overlap the end plies of the cylinder portion of the container and are firmly bonded thereto.

Shipping containers constructed in accordance with the present method may vary in size from a capacity of a few gallons to several thousand gallons, and the walls thereof may be formed of from two plies of cord fabric up to a dozen or more of such plies, as needed to supply the required strength. The cylindrical walls of such drum-shaped containers are preferably stiff enough to cause the container to stand alone when empty ready to receive the liquid or other material to be shipped therein, but such container is preferably flexible enough to enable it to be folded into a relatively compact condition so that these folded empty containers may be stacked one on top of the other for shipment to the point of use.

Each shipping container constructed in accordance with the present method preferably has a thick film of rubber at its inner face to provide a liquid-tight liner for the container, and also has a thick film of rubber at its outer face to protect the underlying cord structure. Such protecting films may be formed of ordinary rubber, or a synthetic rubber that is selected for its property of resisting the destructive action of the material to be shipped therein. For example a Buna N lining may be desirable in a receptacle to contain petroleum products, whereas for shipping many other materials a neoprene liner may be desired.

In accordance with the present method the cylindrical body portion of the flexible reinforced container is formed by laying successive layers of reinforced cord fabric about a cylindrical non-collapsing form which is rotatably supported, and the outer end of this form is rounded where the cylindrical and end walls meet. One end or head of the container is formed and firmly secured to the cylindrical wall of the container by causing the outer marginal portions of the head forming sheet to overlap and bond to inwardly bent marginal portions of the cylindrical body plies.

When one container head has been built up and secured to the body portion of the container in the manner just described, this body portion is then partially peeled back over itself to bring the remaining open end of the body into the vicinity of the closed head of such body, so that other head forming sheets may be secured to this peeled back end portion of the body and secured thereto in overlapping relation to close this second end of the container. This makes it possible to form a barrel shaped container on a non-collapsing form and firmly secure both heads of the container in place while the container is supported by such form.

As soon as the container is made up as just described, it is transferred from its supporting form into a vulcanizing receptacle the cavity of which has the size and shape it is desired to impart to the finished outer surface of the container, and since the container is formed of reinforced unvulcanized rubber which is soft and tacky, the container needs to be handled carefully until it is vulcanized. This makes it important to employ mechanism, to be described, to facilitate the turning of the cylindrical body further back upon itself.

The present flexible shipping container can be made extremely strong and durable, since it is preferably made of strong cord fabric, although it may be made of coated fabric such as coated duck. It will not rust or corrode and has waterproof inner and outer surfaces, and therefore should give years of useful service.

This container is liquid and air tight, and in many cases it may be desirable to provide the bung hole cap or other closure for the filling opening with an air valve, similar to that used in automobile tires, so that after the drum is filled with liquid or a powder material, gas or air under pressure may be forced into the drum to fully inflate the same or pressurize it, so that its cylinder walls will become stiff enough to prevent them from flattening appreciably under the weight of the container when resting upon its side. This will make it possible to roll the filled and inflated container like a rigid drum.

The container is shown as provided with a cylindrical body and rounded convex heads or ends firmly attached to the cylindrical body, and these convex heads preferably are provided with depressed or concave central areas, so that the reinforced fabric portions of the container will be constructed throughout with curved surfaces that are well adapted to withstand internal pressures.

In such a flexible container it is important to prevent the central areas of the ends from bulging outwardly under internal pressure and form protruding ends. This is accomplished by providing within the container an axially disposed flexible link connection between the heads to limit the distance therebetween and hold these heads cupped inwardly, so that the container will rest firmly on either end in an upright position without rocking. This centrally disposed link serves another function, in that it is proposed to provide each flexible container with a lifting loop or eye at one or both ends, so that a hoisting hook can be engaged therewith when it is desired to lift the loaded container. The connecting cable just mentioned will serve to transmit a lifting pull from the eye at the upper end of the container direct to the head at the lower end of the container, so that the lifting load will be borne primarily by the cable and not by the side walls of the container. If a lifting eye is provided at each end of the container, one may be used to support the container upside down to empty the same.

If the layers of cord fabric forming the cylindrical body of the container are disposed at the correct opposite helical angles the body will not distort appreciably from its desired cylindrical shape when the container is subjected to an internal gaseous pressure or to the weight of a liquid confined therein or both. In the manufacture of high pressure rubber hose where the hose is subjected to lateral and longitudinal pressures, the practice is to wind the reinforcing cords at a helical angle of about 52 degrees to the longitudinal axis of the hose, although the theoretical correct angle is about 56 degrees.

In the construction of the container of the present invention the central link connecting one head to the other carries part of the longitudinal pull that would be exerted on the cylinder side walls if this link were omitted and the container inflated. On the other hand where the filled container is sitting on one end, or is suspended from the eye at the upper end, it is subjected to other forces than those present in an inflated hose. Therefore the helical angle used in the container of the present invention should be such as to resist the various forces just mentioned. The odd plies of cord fabric should extend in one direction in the container at the selected helical angle and the even plies should extend in the opposite direction at the same angle. If the cupped or concaved area at each end of the container is relatively large then the central cable will take a large portion of the end pressure in an inflated container and the longitudinal pull on the cylindrical walls will be relatively small. On the other hand if this cupped area is small then the load upon the cable will likewise be small.

Since the cylindrical body of the container is made of cord fabric, in which each cord is embedded in rubber with a substantial distance between the cords, it is possible to crowd the cords close together at each end of the cylindrical body as these ends are forced inwardly to conform to the arcuate curved surface of the building form. As a result the marginal cylindrical cords, when forced inwardly a short distance will move close together and form a smooth curved surface to which the marginal peripheral portions of the plies of the rounded heads can be firmly bonded. That is in constructing the present shipping container the end portions of the cylindrical plies forming the body of the container are crimped inwardly, but this crimped effect disappears as the cords in this area are forced close together to form a smooth curved rim at each end of the cylinder, to which the rounded convex heads can be firmly bonded.

It will be seen from the foregoing that the present invention contemplates a method whereby a flexible or collapsible drum of reinforced fabric can be built on a non-collapsing form that supports the drum while each head or end is secured in place.

The above and other features of the present method will be more fully understood from the following description when read in connection with the accompanying drawings; wherein.

Figure 1:
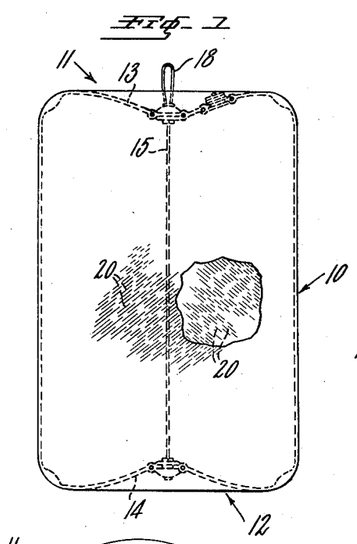
Fig. 1 is a side elevation of a shipping container embodying the present invention, one side wall being partly broken away to show the angle of the cords in an underlying ply.
Figure 2:
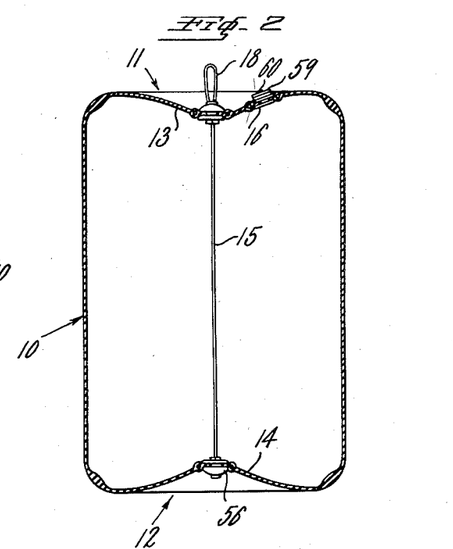
Fig. 2 is a vertical sectional view through the container of Fig. 1.
Figure 3:
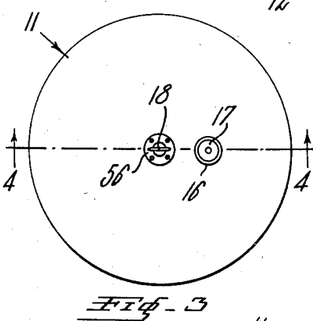
Fig. 3 is an end view of the bung-containing end of the container of Fig. 1.

The particular embodiment of the container illustrated in the drawings has a cylindrical body 10 and heads 11 and 12. The head 11 has the cupped central depression 13 and the head 12 has a similar depression 14. Within the container is provided the central anchoring strand or cable 15 attached to the cup-shaped depressions 13 and 14 to limit the distance between these cupped ends when the container is filled or pressurized, and the length of this cable should be such as normally to hold both heads cupped inwardly as shown in Fig. 2.

Figures 6, 7, 8, 10:
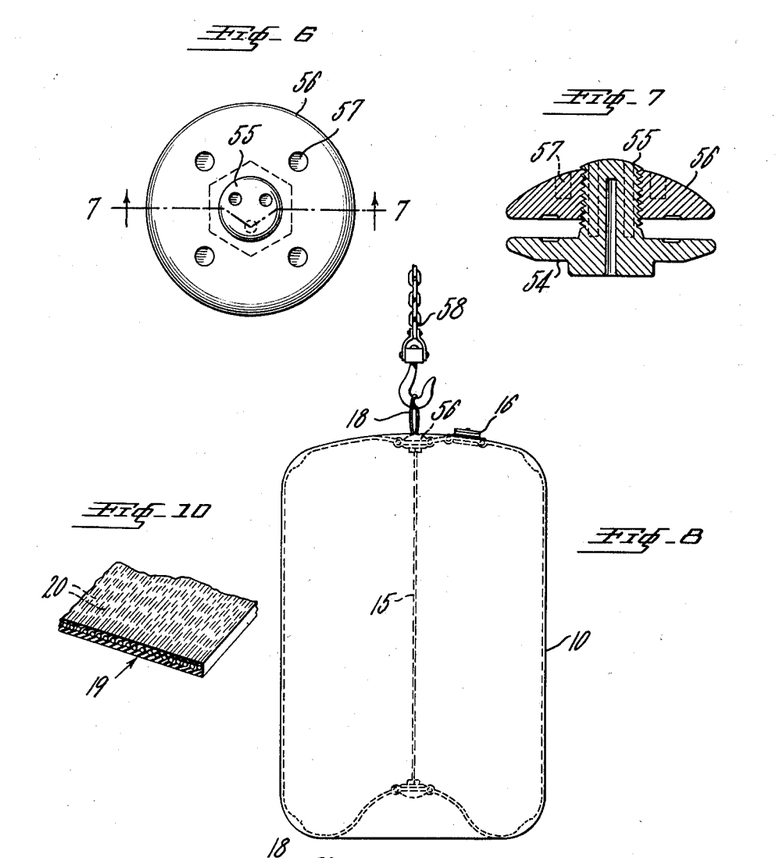
Fig. 6 is a top plan view of a clamping fixture to be described.
Fig. 7 is a sectional view taken on the line 7—7 of Fig. 6.
Fig. 8 is a view similar to Fig. 1 but shows the loaded container as suspended from a supporting hook, and also shows how the inner cable transmits the load from the upper to the lower head.
Fig. 10 is a sectional perspective view of a piece of cord fabric such as may be used in constructing the cylindrical side walls and heads of the container of the present invention.

The head 11 is shown as provided with a bung hole formed by the metal sleeve 16 having the closure or cap 17. This head 11 is also provided with a loop or eye 18 by means of which the shipping container may be lifted, as shown in Fig. 8. The eye is secured to the cable 15 by a construction which will be hereinafter described.

Figures 11, 12, 13, 14, 15:
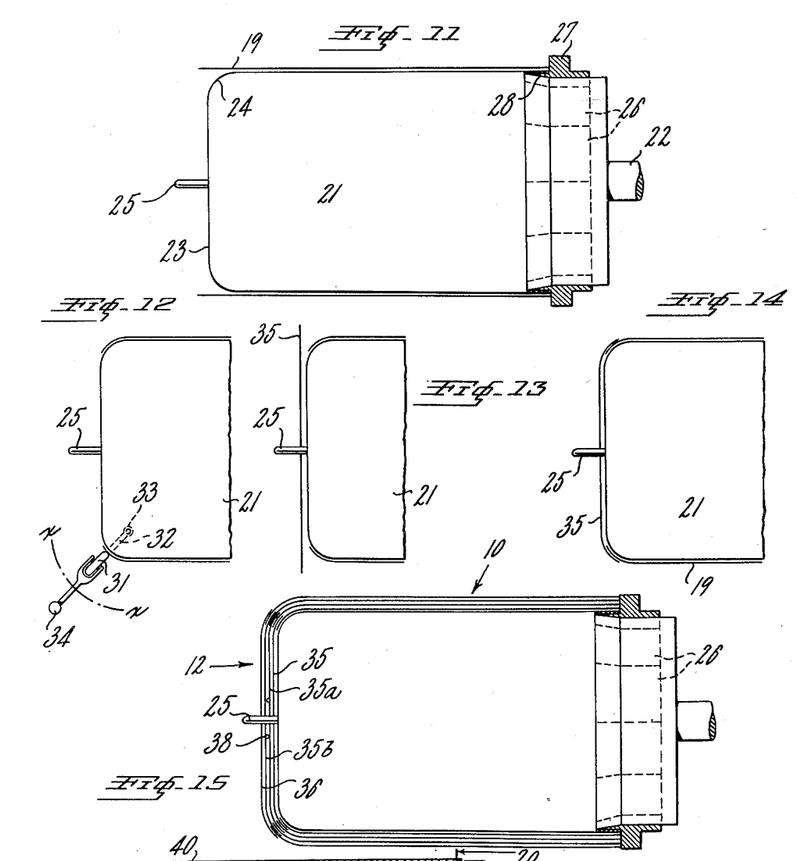
Fig. 11 is a side view of a rotatably supported, cylindrical building drum, having one body forming ply of cord fabric shown thereon in section.
Fig. 12 is a side view of a portion of the form of Fig. 11 showing how the marginal end portion of the body ply is rolled inwardly against the form.
Fig. 13 is a view similar to Fig. 12 showing the first end ply in place.
Fig. 14 is a view similar to Fig. 13 and shows the marginal outer portion of the first end ply as bent inwardly into overlapping relation with the inwardly curved portion of the first body ply.
Fig. 15 is a view similar to Fig. 11 and shows the form as having thereupon in section the cylindrical body and one head of a four ply container.

The shipping container so far described is made, in accordance with the present method by building it over a rigid form, the outer surface of which has the general contour it is desired to impart to the interior of the finished container. Such a form is shown in Fig. 11 of the drawing and is used to support the container during the building of the cylindrical body portion and one rounded head, of the desired number of coated fabric plies. Then the cylinder body portion of such container is turned inside out to the extent shown in Fig. 18 by partly peeling the body back so that the second head can be applied, whereupon the turning of the container is completed to remove the container from the building form and at the same time place it inside of a curing or vulcanizing mold to be described.

In constructing the collapsible container of the present invention it is desired to use a cord fabric such as shown in Fig. 10, but a coated fabric such as a woven fabric coated with rubber may be used, at least in some portions of the container. The cord fabric 19 shown in Fig. 10 is formed of the cords 20 embedded in rubber or other plastic material, and it will be noted that the cord fabric of Fig. 10 has a thicker coating of rubber on the lower face than on the upper face. Such a construction is desirable for the innermost ply and outermost ply so as to provide a thick film of rubber over the cords at the inner face of the container to prevent the confined liquid from penetrating through such rubber film to the cords, and it is desirable in the outermost ply of the container to provide a thick protecting film of rubber over the outer layer of cords. The intermediate plies of cord fabric preferably should have the same thickness of rubber at each face of the cord fabric. The coating material used to embed the cords may be natural rubber, synthetic rubber or a flexible rubber-like material as above stated. The cords 20 may be formed of cotton, rayon or other textile fibers or filaments, and these cords preferably are spaced a substantial distance apart, that is such space may be approximately equal to the diameter of the cord, so that when the cord fabric is bent around the curved end of the building form, as hereinafter described, the cords will have sufficient room to move close together and conform accurately to this arcuate curve of such form.

Figure 16:
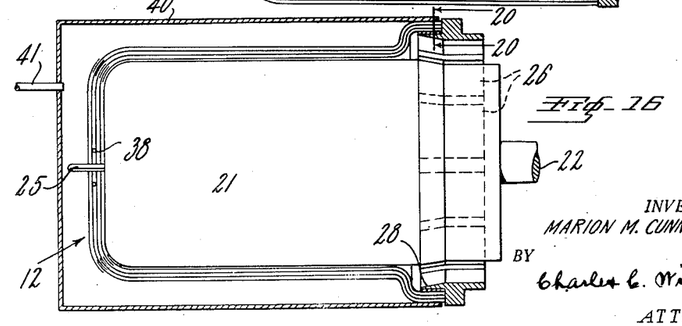
Fig. 16 shows the construction of Fig. 15 as having associated therewith a turning shell used to turn the cylindrical body inside out.
Figure 17:
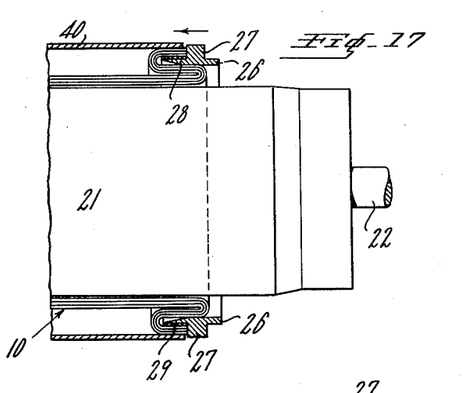
Fig. 17 is a view similar to Fig. 16 showing the position of the turning shell and expanding clamping chuck advanced to a partly turned position.
Figure 20:
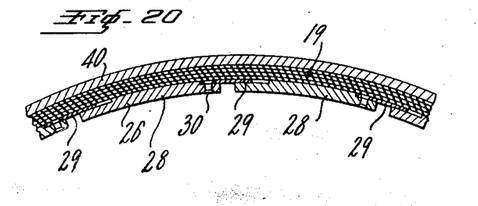
Fig. 20, on a larger scale, is a sectional view taken on line 20—20 of Fig. 16.

The detailed steps which are preferably employed in constructing the collapsible shipping container of the present invention will now be described, as such container is built upon a permanent non-collapsing form, such as the cylindrical form 21 shown in Fig. 11 and other views of the drawings. This form is supported and rotated by the driving shaft 22, and the outer end of this form may have the relative flat face 23, and it is important to provide the form with a relatively large radius 24 extending from the cylinder portion of the form 21 to the end 23. The building form is provided at the center of its end 23 with the positioning pin 25 which serves to center the end plies as the container is being built. At the other end of the cylindrical form 21 is provided an expansion chuck having the arcuate expansion jaws 26 which are supported by a head, not shown, so that they can be forced radially outwardly from the collapsed position in which they are shown in Figs. 11 and 15 to the expanded position in which they are shown in Figs. 16 and 17. Each jaw 26 has an outwardly extending rib 27 which acts as a guide for the cord fabric plies as they are placed upon the cylindrical form, and each jaw 26 also has a curved, work-engaging blade 28. In order to bridge the gap between these jaws when the chuck is expanded it is desirable to provide a thin plate 29 crossing such gap and which is secured to one jaw by a rivet 30 and projects into a groove in the next jaw as shown in Fig. 20. The expansion chuck formed of the jaws 26 normally is supported at one end of the form 21, as shown in Fig. 11, and independently of such form so that it will not rotate therewith, but is adapted to be expanded by cams or other means not shown, and also is adapted to be moved lengthwise of the form 21 to a position in which it is shown in Fig. 17 and also approximately to the outer end of such form. It can then be moved back to its at rest position in which it is shown in Fig. 11. The purpose of this expansion chuck is to facilitate the turning of the cylindrical body portion of the container upon itself as will be apparent upon examining Figs. 16, 17 and 18.

In building the cylindrical body portion 10 of the container two, four or more plies of uncured cord fabric may be used. These plies of fabric are so cut that the cords will form an angle of somewhere near 50° to the longitudinal axis of the finished container. These cord fabric plies are laid upon the form 21 so that one edge will engage the rib 27 and the cords of the odd plies will extend across the longitudinal axis of the drum in one direction, and the cords of the even plies will cross such axis in the opposite direction but at the same angle.

The various cord fabric plies that are to be used in forming the cylindrical body portion of the container should be cut to the desired width and with the cords extending at a predetermined angle to such cut width. Then the first ply 19 may be laid upon the form as shown in Fig. 11 with one edge of such ply resting against the rib 27, to thereby accurately position the opposite end of such ply relative to the end wall 23 of the form 21 as shown, and this ply should be positioned upon the form to entirely surround the form with its opposite ends meeting or overlapping very slightly. If desired, a shallow groove may be made spirally in a face of the drum 21 to receive and position the leading edge of the first ply 19, and suction holes may be provided to hold this edge in place. As soon as the first ply 19 is placed about the form 21 with one end projecting slightly beyond the end wall 23, then this protruding end of the sheet 19 is bent or rolled inwardly to conform accurately to the curved portion 24 of the form as shown in Fig. 12. And since the cords 20 of the fabric 19 are spaced a substantial distance apart they will move inwardly towards each other as this fabric is rolled about the arcuate end of the form. As a result the cord fabric will lay more smoothly about such rounded end than would a closely woven reinforcing fabric such as duck. This operation of working the protruding end of the ply 19 into smooth contact with the arcuate portion 24 of the form may be easily performed by rotating the form 21 and using a stitching wheel or roller 31 (see Fig. 12), which is rotatably supported by a bracket 32 that is pivotally mounted at 33 on a supporting structure, not shown, but located below the cylindrical form 21. The roller 31 may be rocked about its pivot 33 by a handle 34, and may also be tilted slightly by rocking this handle to thereby facilitate the travel of this roller about the arc 24 towards and from the central axis of the rotating form through the arc x—x of Fig. 12.

Figure 19:
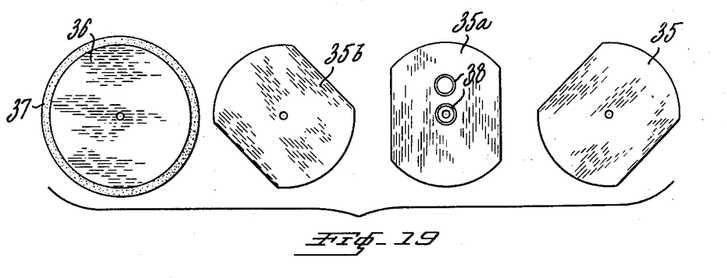
Fig. 19 is a view showing the four end plies of a head disposed in spaced relation to each other and with the cords of one ply disposed at 45 degrees to the cords of the next ply.

After the protruding end of the first ply 19 has been bent inwardly into contact with the arcuate surface 24, then an end ply such as indicated by 35 in Fig. 19 may be applied. This end ply may be formed of cord fabric similar to that used for the body portion of the container, and three of the four end plies shown are designated by 35, 35a and 35b and resemble a rectangle with rounded ends. This shape is due to the fact that a few cords have been omitted from two sides for a purpose, to be described. The fourth end ply, which will contact the liquid at the inner face of the container when the same is in use, is formed of cord fabric in the form of a complete circle as indicated by 36 and to this disc 36 is secured a disc of rubber 37 which is slightly larger in diameter than the disc 36. The purpose in providing this larger disc of rubber 37 is to cover the cords completely at the inner face of the container so as to prevent the liquid contents of the container from reaching the cords and causing objectionable wicking.

Each of the end plies shown in Fig. 19 preferably is provided with a central hole adapted to fit over the pin 25 as shown in Fig. 13, as this provides a simple means for centering each end ply relatively to the form 21. As soon as the ply 35 is placed in the position in which it is shown in Fig. 13 it is stitched or rolled into overlapping engagement with the end portion of the ply 19 into bonding engagement therewith as shown in Fig. 14, the rolling wheel 31 being employed and the form rotated at this time.

Figure 5:
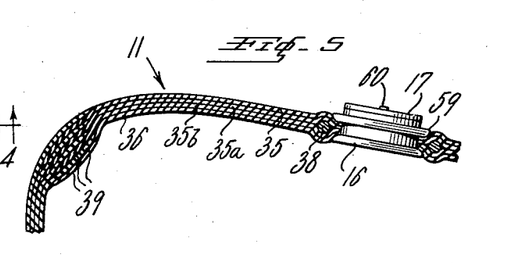
Fig. 5 on a still larger scale is a sectional view of a portion of the construction shown in Fig. 4.

After the first body ply 19 and first end ply 35 are secured in place as shown in Fig. 14, the other body plies and end plies are similarly applied one at a time to build up a container having the desired wall thickness, four such plies being shown in Fig. 15 in the cylinder body portion of the container and also in the end portions thereof. One of the plies 35a or 35b preferably has adhered thereto the metal rings 38 so as to embed such rings in the head of the container where they later will serve to help anchor in place the metal fixtures to be described. The reason a few cords are omitted from each side of the approximately round discs 35, 35a and 35b as shown in Fig. 19 is to reduce the bulge they form at 39 and allow this portion of the container to expand to conform to the shape of the vulcanizing mold. This bulge 39 lies at the inner face of the finished container as shown in Fig. 5.

Figure 18:
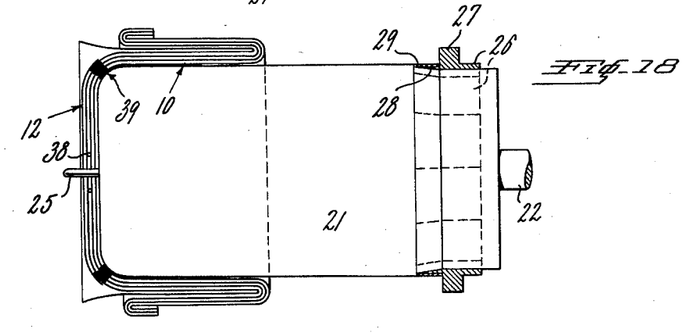
Fig. 18 is a view similar to Fig. 15 which shows one-half of the container as turned back over the other half ready to receive the second head of the container.

Since as herein contemplated the container is built upon the form 21 inside out and later turned, the ply 19 which contacts the form 21 will become the outermost ply in a finished molded container, and the outermost ply shown in Fig. 15 will become the lining ply in the finished vulcanized container. During the turning operation the innermost ply 19 will be subjected to the greatest expanding action. After the several body forming plies and end plies have been assembled and their overlapping edges bonded one to the other as indicated by 39 in Fig. 5 and other figures, the container is turned part way inside out as shown in Fig. 18, so that the second head or end of the container may be secured in place.

The various plies forming the container shown in Fig. 15 are in a raw, tacky condition. It is therefore difficult to turn the body portion of the container unless the surfaces are covered with talc or, care is taken to prevent one tacky surface from engaging another. This turning operation is readily performed by employing the construction shown in Fig. 16, wherein there is shown in section an air-tight casing 40 that is placed over the cord fabric container in spaced relation thereto, and it will be noted that the expansion chuck formed of the sections 26 has been expanded to enlarge the inner end of the container and force this end into air-tight contact with the inner periphery of the casing 40, so that it is now possible to build up air pressure within the casing 40 without air escaping adjacent the expanded end of the cylinder 10. If air is now forced into the casing 40 through an air supply pipe 41 to build up pressure therein, this pressure will serve to move the casing in a left-hand direction viewing Fig. 16 to thereby initiate turning of the container. As this turning operation proceeds as shown in Figs. 17 and 18, the air pressure just mentioned will serve (1) to cause the main portion of the cord fabric container to hug the form 21 tightly so as not to slip endwise thereupon and (2) to maintain a film of air between the non-moving and moving portions of the container during the turning or peeling operation, to thereby prevent one tacky surface from being dragged over another. In this way the cylinder wall of the container is readily turned. This turning operation should be continued for about half the length of the drum 10 and until the turned portion reaches the position shown in Fig. 18, to position this end so that it can be laid over the first head, and secured to the plies of the second head with the desired amount of overlap. The second head is then built up by stitching the end plies one at a time, starting with the ply 36, to the proper inward turned portion of the cylindrical body to form the double ended container shown in Fig. 21. The overlapping plies are stitched one to the other by employing the roller 31. Since the second head 11 is formed over the first head 12 as shown in Fig. 21 one head will be slightly larger than the other at this time, but since the entire container is expanded by internal pressure to fit the inside of the vulcanizing receptacle, this is not important.

Figure 21:
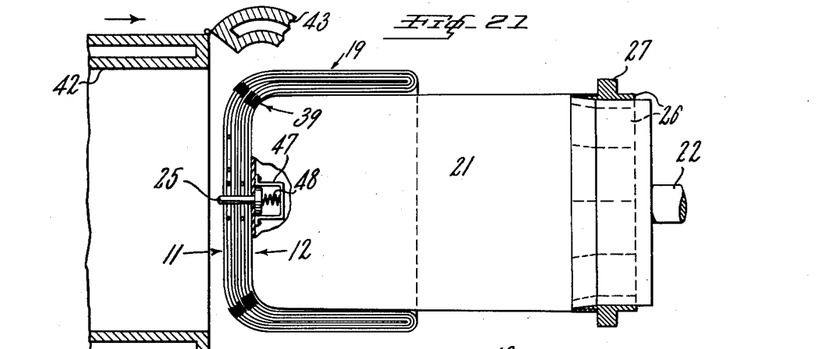
Fig. 21 is a view similar to Fig. 18 but shows both heads in place and part of the vulcanizing receptacle.
Figure 22:
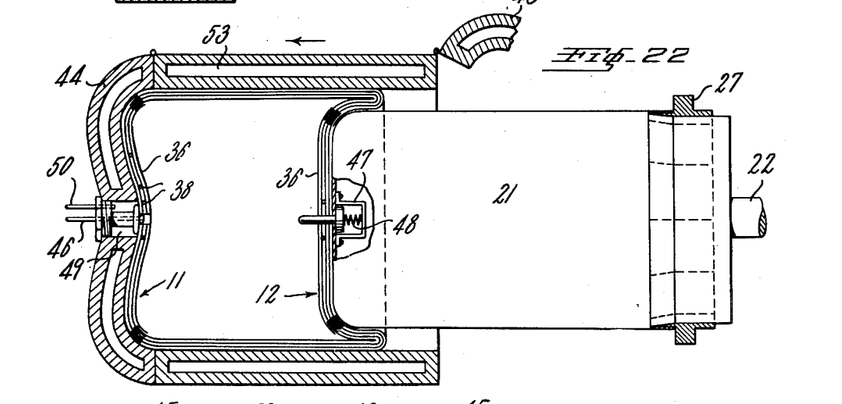
Fig. 22 shows the container as partly removed from the building form and transferred to the inside of the vulcanizing receptacle that is shown in section.
Figure 23:
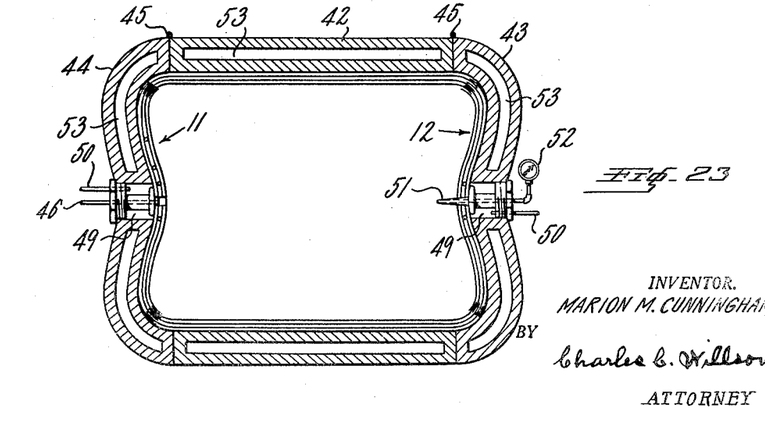
Fig. 23 is a sectional view through the closed vulcanizing receptacle, with the container of the present invention therein.

After both heads 11 and 12 are secured to the cylindrical body portion of the receptacle as shown in Fig. 21, the container is further peeled or turned to remove it from the form 21, and at the same time deposit this tacky uncured container within a curing mold or vulcanizing mold, which mold as shown in Figs. 21 to 23 comprises a central cylindrical portion 42 and the hinged end portions 43 and 44 having the hinges 45. This vulcanizing receptacle is partly shown in Fig. 21 as having the end 43 wide open and the cylindrical portion 42 in position to be advanced over the cord fabric container far enough to bring the head 44 of this vulcanizer into contact with the outer head 11 of the container.

Since as above stated the flexible container contemplated by the present invention is formed with cupped shaped depressions 13 and 14 at the ends thereof, the end walls or doors 43 and 44 of the vulcanizer are preferably shaped as shown to the contour it is desired to impart to the outer wall of the finished vulcanized heads 11 and 12 of the container. Likewise the cylindrical portion 42 of this vulcanizer is preferably given the finish it is desired to impart to the outer cylindrical body of such container. After the vulcanizer has been placed over the partly turned container shown in Fig. 21, further turning of the container is effected by introducing air under pressure between the inner faces of the heads 11 and 12. This is done by providing an air pressure pipe 46 attached to the central portion of the vulcanizer head 44 and the inner end of this pipe will push the centering pin 25 inwardly into its receiving box 47 against the resistance of the coil spring 48, and force air into the space between the two heads 11 and 12. Separation of these heads may be assisted by providing the vulcanizer head 44 with the central vacuum cup 49 having leading therefrom the vacuum pipe 50. The arrangement is such that a suction action is exerted upon the head 11 by the vacuum means just described and at the same time air is forced into the space between the heads 11 and 12 by the compressed air pipe 46.

Air pressure is built up by the means just described between heads 11 and 12 to force these heads apart, and this will move the vulcanizer to the left as the container is further turned, as will be apparent from Fig. 22, and as the air pressure is built up within the turning container it will maintain a thin film of air between the moving and non-moving portion of the cylindrical wall to prevent one from adhering to the other. This internal air pressure will serve also to force the unvulcanized container into contact with the various walls of the vulcanizer. As the container is gradually filled with air and the operation of turning or peeling the same within the vulcanizer advances, the vulcanizer will move away from the form 21 so that the door 43 may be closed, and as this is done a tapered hollow plug 51 will enter the hole in the head 12 to plug this hole and at the same time connect the interior of the container with a gauge 52 that indicates the pressure established within the container to hold its walls in snug engagement with the inner walls of the vulcanizing receptacle. The end wall 43 of the vulcanizer is preferably provided with a vacuum cup 49 and vacuum pipe 50 similar to the vacuum means above described and will help to hold the head 12 in intimate contact with the inner face of the end wall 43, and at the same time exhaust air from around the outer surface of the container. With the parts in the position shown in Fig. 23 the doors 43 and 44 of the vulcanizer are locked shut and a relatively high pressure is built up inside of the container to force its walls into intimate contact with the inner walls of the vulcanizing receptacle throughout the vulcanizing period. It will be noted that the vulcanizer is formed with hollow walls having the fluid receiving spaces 53 adapted to be supplied with a heating fluid such as hot oil or steam.

After the cord fabric container has been sufficiently vulcanized within the receptacle 42, 43, 44, a door may be opened and the container removed therefrom. This completes the operation of manufacturing the container contemplated by the present invention, except for installing the metal fixtures that are best shown in Figs. 4, 5, 6 and 7.

It is desired to point out that the first ply 19 and succeeding plies are laid on the drum 21 so that the cords will form a slightly smaller angle with the axis of the container than is desired in the finished vulcanized container. As one end of the container is expanded radially as shown in Fig. 16, and is advanced in the container turning direction, the cords in this area will be moved outwardly and at the same time their angle to the container axis will increase slightly. This is possible because of the plastic or doughy condition of the unvulcanized rubber in which the cords 20 are embedded, and it is this ability of the cords to shift in the plies that makes practical the turning of a container formed of four or more plies as contemplated by the present invention.

It is important that all portions of the container be fully extended during the vulcanizing period so that no wrinkles or slack portions will occur. The inside of the vulcanizing mold is therefore made large enough to cause all portions of the under size cylindrical walls to be stretched by the air inflating pressure during the vulcanizing period. Likewise the ends walls 43 and 44 which force the central area of the container ends inwardly stretch the container ends sufficiently to remove all wrinkles.

Figure 4:
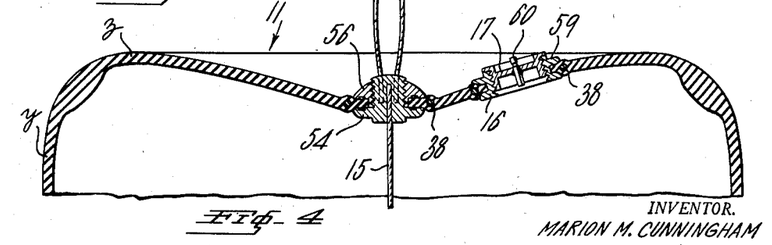
Fig. 4 on a larger scale is a sectional view taken on the line 4—4 of Fig. 3.

The centrally disposed tie cable 15 above described has each end thereof, in the construction shown, firmly anchored to a disc 54 having a threaded integral post 55, which post is adapted to receive a threaded cap or nut 56. The arrangement is such that the discs 54 attached to the opposite ends of the cable 15 may be inserted through a bung hole cut in the container, whereupon a post 55 is inserted in a central hole provided in each head. The nut 56 having the wrench holes 57 is engaged with the threaded post 54 and screwed down to clamp the parts firmly in place as shown in Fig. 4, with the outer marginal edges of the clamping members 54 and 55 cooperating with the strengthening ring 38 to provide a strong, fluid tight, anchoring means for the cable at each end of the container. The lifting eye or loop 18 is firmly secured to the post 55. When desired the container may be lifted by a hoisting chain 58.

The container of the present invention is also preferably provided with a filling and emptying hole, which in the construction shown takes the form of a bung hole that may be formed in a side wall of the cylindrical body, or at the highest point in the container if desired to facilitate draining of all of the liquid out of the container. Such bung hole is shown as provided at one end of the container near the central anchoring means, where it is protected to some extent by the highest point of the head. This bung hole is formed, as above stated, by the sleeve 16 having the closure cap 17. This sleeve 16 has secured thereupon the clamping sleeve 59 and lying between flanges upon these sleeves is the reinforcing ring 38. The cap 17 may have an air valve 60 similar to that used in pneumatic tires so that after the container has been filled with a liquid or powdered material air or gas may be introduced to pressurize the container. Such air or gas pressure may vary from about 1 to 10 pounds per square inch as desired, and it will serve to keep the walls of the container fully inflated so that the container may roll on its side like a rigid drum. Furthermore the gas used to inflate the container may, if desired, be an inert gas such as nitrogen or carbon dioxide used to preserve certain foods or displace oxygen in the container.

An important feature of the present container resides in the shape of the end portions of the container whereby it is well adapted to resist internal pressures. This is accomplished, as above pointed out, by forming the body of the container with cylindrical walls and the heads of the container with convex walls having depressed or cupped center portions, and by also providing a connecting link between such heads or centers to keep them from bulging outwardly. In order to prevent the convexed end walls from being subjected to excessive strains, when the container is loaded or pressurized, the container should have a relatively large curve where the end walls and side walls meet and overlap, and such curved end portions of the container should form a zero angle with the cylinder body walls at the approximate position of $y$ of Fig. 4 of the drawing. The location of the hump or high point $z$ is less important as this hump may lie either closer to or further from the central axis than shown in Fig. 4 of the drawing.

If the cable 15 should be omitted, then the central portion of the heads 11 and 12 would extend outwardly when the container is pressurized. This would pull the side walls at the ends of the cylinder inwardly and set up undesired bending forces, unless the container ends bulge outwardly and are semi-spherical in shape. In the absence of the cable 15 the side walls would be subjected to the transverse and longitudinal pressure of the confined fluid, and to prevent the cylindrical walls from bulging outwardly out of shape under such forces, the reinforcing cords 20 should lie at an angle of about 52° to the longitudinal axis of the vulcanized container. When however the cable 15 is employed the longitudinal pull upon the cylinder walls will be reduced, with the result that an angle slightly greater than 52° may be employed, depending somewhat on the location of the hump which controls the size of the depressed cup portion of the heads. However the shipping container of the present invention when filled with liquid or other material, will be subjected to added internal forces due to the weight of the material therein, and these forces will change when the container rests on one end or on a side, or is suspended as shown in Fig. 8. All these conditions will need to be considered in selecting the cord angle, which should, it is believed, be slightly above 52 degrees to avoid substantial deformation of the container.

Figure 9:
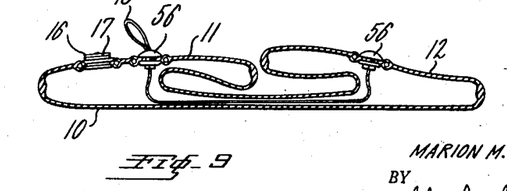
Fig. 9 shows the container of Fig. 1 after it has been emptied and collapsed so that it will occupy very little space.

The ratio of the length of the container to its diameter may vary in a fairly wide range and still meet the requirement of good design. The four ply container shown in the drawing is well adapted for use as a 55 gallon shipping container for petroleum products, acids, alkalis, paint, dyes and other liquids. When such a container is empty it can be collapsed into a small space as shown in Fig. 9 for stacking one on top of the other and shipping to the return point. Furthermore, while the container is preferably stiff enough to stand upright when empty, so that it is easy to fill, its ability to collapse under slight pressure, makes it possible to collapse the container as it is being emptied so that the contents may be removed from the container without the need of venting air therein, and also the collapsed container can be filled without the need of venting air therefrom.

In addition to the advantages above mentioned, the present container will not rust or corrode, particularly if the metal parts above described are made of stainless steel, and the strong durable cord fabric should be capable of resisting many severe blows and of giving years of shipping service.

By employing the method of the present invention in which the container is turned inside out, or more specifically in which the body of the container is built upon a rotating drum or form, then one end is applied, and then the body is peeled back upon itself and the other end is applied, it is possible to form a closed container having similar reinforced fabric ends firmly bonded to the body in overlapping relation therewith.

Having thus described my invention what I claim and desire to protect by Letters Patent is:

1. The method of making a collapsible closed container having a body and heads secured to the body, which comprises forming the body of coated fabric laid over a supporting form, securing a head of coated fabric to one end of said body, peeling the body part way back over itself far enough to bring one end approximately opposite the other end, securing a second head of coated fabric to the peeled back end of the body, and removing the body from the form.

2. The method of making a collapsible closed container having a body and heads secured to the body, which comprises forming the body of coated fabric laid over a supporting form, securing a head of coated fabric to one end of said body, peeling the body part way back over itself far enough to bring one end approximately opposite the other end, securing a second head of coated fabric to the peeled back end of the body, and then further peeling to remove the container from the form and complete the turning of the container inside out.

3. The method of making a collapsible closed container having a body and heads secured to the body, which comprises forming the body of coated fabric laid over a supporting form, securing a head of coated fabric to one end of said body, peeling the body part way back over itself far enough to bring one end approximately opposite the other end, securing a second head of coated fabric to the peeled back end of the body, then further turning the container inside out and placing it in a curing receptacle and inflating the container to force it into close contact with the walls of such receptacle.

4. The method of making a collapsible closed container having a cylindrical body and rounded heads secured to the body which comprises forming the cylindrical body of coated fabric laid over a supporting form, securing a head of coated fabric to one end of said body, peeling the cylindrical body part way back over itself far enough to bring one end approximately opposite the other end, securing a second head of coated fabric to the peeled back end of the cylindrical body, and removing the body from the form.

5. The method of making a collapsible container having a body and heads secured to the body which comprises forming the body of coated fabric laid over a supporting form, securing a head of coated fabric to one end of said body, peeling the body part way back over itself far enough to bring one end approximately opposite the other end, securing a second head of coated fabric to the peeled back end of the body, then further peeling the body back over itself to turn the container inside out, and placing the turned container in a curing receptacle having inwardly sunken ends and inflating the container to force it into close contact with the walls of such receptacle, to thereby provide a container having slightly inwardly cupped heads.

6. The method of making a collapsible container having a cylindrical body and rounded convex heads secured thereto, which comprises forming the cylindrical body of plies of coated cord fabric laid over a supporting form so that the cords of one ply form a substantial angle with the cords of the next ply, securing a head of coated fabric to one end of said body and bonding its outer periphery to said cord fabric in overlapping relation therewith, peeling the cylindrical body part way back over itself far enough to bring one end approximately opposite the other end, and securing a second head of coated fabric to the peeled back end of the cylinder body, so that the outer marginal portions of the heads overlap the end portions of the cord fabric of said body.

7. The method of making a collapsible container having a cylindrical body and rounded heads secured thereto, which comprises forming the cylindrical body over a supporting form having a rounded convex end, by laying plies of coated cord fabric upon said form so that the plies extend a short distance over the convex portion of the form and forcing the protruding end portion into smooth conformation with such convex end, securing a head of coated fabric to such convex end, peeling the cylindrical body part way back over itself far enough to bring one end approximately opposite the other end, and similarly securing a second head of coated fabric to the peeled back end of the cylindrical body.

8. The method of making a collapsible container having a body and heads secured thereto, which comprises forming the body of coated fabric laid over a supporting form, securing a head of coated fabric to one end of said body, peeling the body part way back over itself far enough to bring one end approximately opposite the other end, securing a second head of coated fabric to the peeled back end of the body, shaping said heads so that they have a convex curvature with a sunken center, and securing an anchoring link in the container between said heads to limit their movement apart.

9. The method of making a collapsible container having a body and heads secured thereto, which comprises forming the body of coated fabric laid over a supporting form, securing a head of coated fabric to one end of said body, then enclosing said body in a turning casing having an open end and securing the other end of the body to the open end portion of this casing, then forcing air into this casing to facilitate turning of the body and retract the casing from its position over the body to peel the body part way back over itself far enough to bring one end approximately opposite the other end, and remove said casing and secure a second head of coated fabric to the peeled back end of the body.

10. The method of making a collapsible container having a body and heads secured thereto, which comprises forming the body of coated fabric laid over a supporting form, securing a head of coated fabric to one end of said body, turning the body part way back over itself far enough to bring one end approximately opposite the other end, securing a second head of coated fabric to the peeled back end of the body, then placing a curing receptacle over this partially peeled back container, and introducing air under pressure between said heads to force the container off of said form and at the same time complete the turning of the container inside out within the curing receptacle.

11. The method of making a collapsible container having a body and heads secured thereto, which comprises forming the body of coated fabric laid over a supporting form, securing a head of coated fabric to one end of said body, enclosing said body in an air-tight turning casing and securing the other end of the body to the casing with an air-tight seal, then forcing air under pressure into this casing to cause the container to hug its form, and retract the casing to peel the casing part way back over itself far enough to bring one end approximately opposite the other end, and then secure a head of coated fabric to this peeled back end of the body.

12. The method of making a collapsible container having a body and heads secured thereto, which comprises forming the body of coated fabric laid over a supporting form, securing a head of coated fabric to one end of said body, peeling the body part way back over itself far enough to bring one end approximately opposite the other end and securing a second head of coated fabric to this end, placing a shaping and curing mold over this partly turned container, and gradually inflating this container to further turn the same by peeling it off the form and at the same time expand it into contact with the inner walls of the curing mold.

13. The method of making a collapsible closed container having a body and ends secured to the body, which comprises forming a body of several layers of coated cord fabric laid over a supporting form, securing a head formed of several fabric plies to one end of said body by attaching an end fabric one at a time to a body layer, peeling the body part way back over itself far enough to bring one end approximately opposite the other end, similarly securing a second head formed of several fabric layers to the peeled back end of the cylindrical body, and then complete the turning of the container inside out.

14. The method of making a collapsible closed container having a body and ends secured to the body, which comprises forming a body of several layers of coated cord fabric laid over a supporting form, securing a head formed of several fabric plies to one end of said body by attaching the end plies one at a time to the body layers, peeling the body part way back over itself far enough to bring one end approximately opposite the other end and maintain an air space at this time between the peeled back portion and body portion it overlies so that one does not engage the other, securing a second head formed of several fabric layers to this peeled back end of the cylindrical body, and then complete the turning of the container inside out.

15. The method of making a collapsible closed container having a cylindrical body and rounded heads secured to the body, which comprises forming the body of rubber coated cord fabric laid over a supporting form, securing a head of coated fabric to one end of said body, peeling the cylindrical body part way back over itself far enough to bring one end approximately opposite the other end, securing a second head of coated fabric to the peeled back end of the cylindrical body, then complete the turning of the container inside out, and inflating the container and vulcanizing it while its body and end walls are held by the inflating pressure in a stretched condition.

MARION M. CUNNINGHAM.

REFERENCES CITED

The following references are of record in the file of this patent:

UNITED STATES PATENTS

| Number | Name | Date |
|---|---|---|
| 2,041,357 | Kraft | May 19, 1936 |
| 2,425,166 | Watson | Aug. 5, 1947 |